(12) United States Patent
Anderson

(10) Patent No.: US 12,240,719 B2
(45) Date of Patent: Mar. 4, 2025

(54) ROTATABLY MOUNTED IDLER

(71) Applicant: Hewlett-Packard Development Company, L.P., Spring, TX (US)

(72) Inventor: Ronald R. Anderson, Corvallis, OR (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 369 days.

(21) Appl. No.: 17/417,178

(22) PCT Filed: Sep. 6, 2019

(86) PCT No.: PCT/US2019/049920
§ 371 (c)(1),
(2) Date: Jun. 22, 2021

(87) PCT Pub. No.: WO2021/045777
PCT Pub. Date: Mar. 11, 2021

(65) Prior Publication Data
US 2022/0185609 A1    Jun. 16, 2022

(51) Int. Cl.
| | | |
|---|---|---|
| *B65H 27/00* | (2006.01) | |
| *B41J 15/04* | (2006.01) | |
| *B65H 20/02* | (2006.01) | |
| *F16C 3/02* | (2006.01) | |
| *F16C 13/02* | (2006.01) | |
| *F16C 17/12* | (2006.01) | |

(52) U.S. Cl.
CPC ............. *B65H 27/00* (2013.01); *B41J 15/04* (2013.01); *B65H 20/02* (2013.01); *F16C 13/022* (2013.01); *F16C 17/12* (2013.01); *B65H 2404/113* (2013.01); *B65H 2404/117* (2013.01); *B65H 2404/1321* (2013.01); *B65H 2404/173* (2013.01); *F16C 3/02* (2013.01); *F16C 2206/40* (2013.01); *F16C 2300/22* (2013.01); *F16C 2300/54* (2013.01)

(58) Field of Classification Search
CPC .......... F16C 13/022; B65H 2404/1321; B65H 2801/06
USPC .......................................... 492/16–20, 39, 40
See application file for complete search history.

(56) References Cited

U.S. PATENT DOCUMENTS

| | | | |
|---|---|---|---|
| 3,228,088 A | * | 1/1966 | Schaeffler ................ D01H 5/74 19/295 |
| 3,375,562 A | * | 4/1968 | Werner .................... D01H 5/76 19/295 |
| 3,847,260 A | | 11/1974 | Fowler |
| 4,746,233 A | | 5/1988 | Garcia de Osuna et al. |
| 4,914,482 A | | 4/1990 | Ammenheuser et al. |
| (Continued) | | | |

FOREIGN PATENT DOCUMENTS

| | | |
|---|---|---|
| DE | 10151989 A1 | 5/2002 |
| JP | 2007261084 A | 10/2007 |

*Primary Examiner* — Jason L Vaughan
(74) *Attorney, Agent, or Firm* — Jordan IP Law, LLC

(57) ABSTRACT

In many continuously webbed machines, media is fed through the machine with rollers mounted to one or more rotating shafts. These shafts may be supported on each end with a cylindrical journal bearing. The rollers move at the same rate as the media to maintain traction with the media to control media position as it moves the media from one process to another through the sequence of processes in the webbed machine.

15 Claims, 4 Drawing Sheets

(56) References Cited

U.S. PATENT DOCUMENTS

| | | | |
|---|---|---|---|
| 4,945,293 A | | 7/1990 | Wittkopf et al. |
| 5,053,826 A | | 10/1991 | Castelli et al. |
| 5,176,456 A | * | 1/1993 | Takebayashi ......... F16C 35/063 |
| | | | 384/537 |
| 5,452,064 A | | 9/1995 | Inomata |
| 5,833,107 A | | 11/1998 | Terranova et al. |
| 7,172,352 B2 | | 2/2007 | Close et al. |
| 7,413,361 B2 | | 8/2008 | Kawaguchi |
| 7,798,949 B2 | * | 9/2010 | Vaaraniemi ........... F16C 13/028 |
| | | | 492/39 |
| 9,079,742 B2 | | 7/2015 | Blanchard, Jr. et al. |

* cited by examiner

ROTATABLY MOUNTED IDLER

BACKGROUND

In many continuously webbed machines, media is fed through the machine with rollers mounted to one or more rotating shafts. These shafts may be supported on each end with a cylindrical journal bearing. The rollers move at the same rate as the media to maintain traction with the media to control media position as it moves the media from one process to another through the sequence of processes in the webbed machine.

BRIEF DESCRIPTION OF FIGURES

Various examples may be more completely understood in consideration of the following detailed description in connection with the accompanying drawings, in which.

Figure 1:
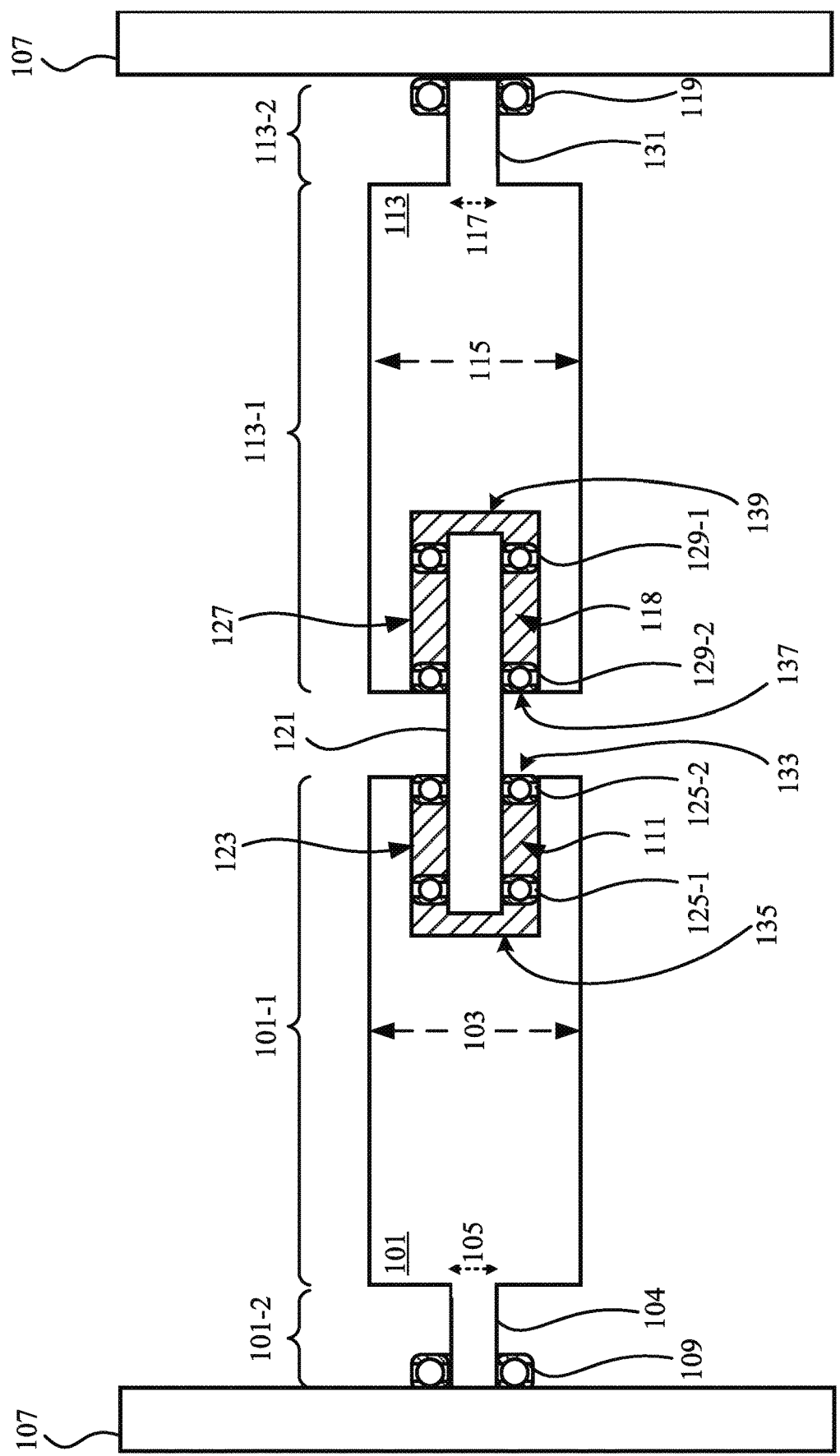
FIG. 1 illustrates an example apparatus including a rotatably mounted idler, consistent with the present disclosure.

While various examples discussed herein are amenable to modifications and alternative forms, aspects thereof have been shown by way of example in the drawings and will be described in detail. It should be understood, however, that the intention is not to limit the disclosure to the particular examples described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Continuously webbed machines are provided as conveyance means for moving media along a media path, also referred to as a web, through the machine. Such conveyance means may include paper or other medium, a conveyance roller, a pinch roller which generates a conveying force by pressing the recording sheet against the conveyance roller, and means for generating a pressing force, among other components. Such conveyance means may move the medium through various processes.

In various examples, the media path may weave through the machine, with some aspects of the machine disposed in a hot environment. For instance, temperatures within and/or near a dryer within the machine may exceed temperatures in other portions of the machine. A live shaft roller may handle webbed material in a hot environment. As used here, a live shaft refers to or includes a roller that includes a solid piece or assembly with bearings disposed at the ends of the roller. However, heat exposure to bearings on the end of the live shaft may reduce the lifespan of the bearings.

In accordance with the present disclosure, a printing apparatus may include a split idler with two independent sides, capable of rotating at different speeds. As used herein, an idler refers to or includes a roller capable of moving a print medium through the printing apparatus to another part of the printing apparatus. A split idler refers to or includes an idler with two or more independent idlers, capable of moving two or more pieces of print media through the printing apparatus. Examples of such apparatus may include a first idler, a second idler, and a shaft. The first idler includes a proximal end and a distal end, where the proximal end has a thicker diameter relative to the distal end. In such examples, the first idler is rotatably mounted to a frame of the apparatus by a first speed-tolerant bearing at the distal end. Additionally, the first idler may have a hollow core at the proximal end and extending a portion of a length of the first idler. The second idler may have a proximal end and a distal, where the proximal end has a thicker diameter relative to the distal end. The second idler may be rotatably mounted to the frame of the apparatus by a second speed-tolerant bearing at the distal end. Moreover, the second idler may have a hollow core at the proximal end and extending a portion of a length of the second idler. A shaft rotatably may be mounted to an inner surface of the hollow core of the first idler by a plurality of heat-tolerant bearings and to an inner surface of the hollow core of the second idler by a plurality of heat-tolerant bearings.

In such examples, each outer end of the split roller assembly may include a live shaft with bearings outside the hot environment. Between and nested in the two roller halves may be a shaft mated to the two roller halves via heat-tolerant bearings. The heat-tolerant bearings may be capable of withstanding higher temperatures than the speed-tolerant bearings disposed outside the hot environment. As such, the split roller assembly described, may allow for two parallel lanes of the media path to move in a same direction, and within a relatively hot environment, without compromising the integrity of aspects of the assembly which enable rotation.

In an additional example, an apparatus according to the present disclosure includes a first idler having a proximal end with a shaft extending therefrom, and a distal end, where the proximal end has a thicker diameter relative to the distal end, and where the first idler is rotatably mounted to a frame of the apparatus by a first speed-tolerant bearing at the distal end. The apparatus may further include a second idler having a proximal end and a distal end, where the proximal end has a thicker diameter relative to the distal end. The second idler may be rotatably mounted to the frame of the apparatus by a second speed-tolerant bearing at the distal end. The second idler may have a hollow core at the proximal end and extending a portion of a length of the second idler. The shaft may be rotatably mounted to an inner surface of the hollow core of the second idler by a plurality of heat-tolerant bearings.

Furthermore, a system in accordance with the present disclosure, may include a chassis, a media feed including a media path and a plurality of dryers, and a plurality of co-axial asynchronous idlers mounted on the chassis and disposed between the plurality of dryers. Each of the plurality of co-axial asynchronous idlers may include a first idler, a second idler, and a shaft. The first idler may have a proximal end and a distal end, where the proximal end has a thicker diameter relative to the distal end. In such examples, the first idler is rotatably mounted to the chassis by a first speed-tolerant bearing at the distal end, and has a hollow core at the proximal end and extending a length of the first idler. Similarly, the second idler may have a proximal end and a distal end, where the proximal end has a thicker diameter relative to the distal end. The second idler may be rotatably mounted to the chassis by a second speed-tolerant bearing at the distal end, and the second idler may have a hollow core at the proximal end and extending a length of the second idler. The shaft may be rotatably mounted to an inner surface of the hollow core of the first idler by a first plurality of heat-tolerant bearings and to an inner surface of the hollow core of the second idler by a second plurality of heat-tolerant bearings.

In the following description various specific details are set forth to describe specific examples, with the understanding that other examples may be practiced without all the specific details given below and that features from figures/examples can be combined with features of another figure or example even though the combination is not explicitly shown or explicitly described as a combination. For ease of illustration, the same reference numerals may be used in different diagrams to refer to the same elements or additional instances of the same element.

Turning now to the Figures, FIG. 1 illustrates an example apparatus including a rotatably mounted idler, consistent with the present disclosure. As illustrated in FIG. 1, the apparatus includes a first idler 101 having a proximal end 101-1 and a distal end 101-2, where the proximal end 101-1 has a thicker diameter 103 relative to the diameter 105 of the distal end 101-1. The first idler 101 may be rotatably mounted to a frame 107 of the apparatus by a first speed-tolerant bearing 109 at the distal end 101-1. As used herein, a speed-tolerant bearing refers to or includes a bearing capable of rotating at a faster speed relative to heat-tolerant bearings 125-1, 125-2, 129-1 and 129-2, discussed further herein. The speed-tolerant bearings may, in some examples, be metal bearings with a lubricant to assist with rotation. Additionally, the first idler 101 may include a hollow core 111 at the proximal end 101-1 and extending a portion of a length of the first idler 101.

Additionally, the apparatus may include a second idler 113 having a proximal end 113-1 and a distal end 113-2. As with the first idler, the second idler 113 includes a proximal end 113-1 that has a thicker diameter 115 relative to the diameter 117 of the distal end 113-2. The second idler 113 may be rotatably mounted to the frame 107 of the apparatus by a second speed-tolerant bearing 119 at the distal end 113-2. Moreover, the second idler 113 may have a hollow core 118 at the proximal end 113-1 and extending a portion of a length of the second idler 113.

As illustrated in FIG. 1, a shaft 121 may be rotatably mounted to an inner surface 123 of the hollow core 111 of the first idler 101 by a plurality of heat-tolerant bearings 125-1 and 125-2. As used herein, heat-tolerant bearings refer to or include bearings capable of withstanding higher temperatures, relative to the speed tolerant bearings 109 and 119. In some examples, the heat-tolerant bearings comprise dry ceramic bearings that do not utilize a lubricant to assist with rotation. Additionally, the shaft may be rotatably mounted to an inner surface 127 of the hollow core 118 of the second idler 113 by a plurality of heat-tolerant bearings 129-1 and 129-2. As the shaft 121 may be coupled to the first idler 101 and the second idler 113 by, in some examples, dry ceramic bearings, which rotate at a slower speed than lubricated metal bearings, the first idler 101 and the second idler 113 may rotate at essentially the same rate of speed. Additionally, and/or alternatively, the first idler 101 and the second idler 113 may rotate at a slightly different rate of speed, because shaft 121 is rotatably coupled to each idler (101 and 113) independently. Accordingly, the proximal end 101-1 of the first idler 101 may be separated from the proximal end 113-1 of the second idler 113 by a threshold distance, such that the first idler 101 and the second idler 113 may freely rotate independent from one another.

The first speed-tolerant bearing 109 at the distal end 101-1 of the first idler 101, and the second speed-tolerant bearing 119 at the distal end of the second idler 113 may, in some examples, include metal bearings. The metal bearings may include a lubricant to allow the bearings to rotate at a high rate of speed. For instance, idler 101 may be coupled to frame 107 via bearings 109. The bearings 109 may be capable of rotating at a high rate of speed, such that materials other than metal may not withstand the pressure as well. The bearings 109 may couple an extension 104 disposed at the distal end 101-2 of the first idler 101 to the frame 107. Similarly, idler 113 may be coupled to frame 107 via bearings 119. The bearings 119 may be capable of rotating at a high rate of speed. The bearings 119 may couple an extension 131 disposed at the distal end 113-2 of the second idler 113 to the frame 107.

In various examples, each of the first idler 101 and the second idler 113 may have two or more bearings disposed in the respective hollow core to facilitate independent rotation of the respective idler and the shaft 121. The proximal end 101-1 of the first idler 101 and the proximal end 113-1 of the second idler 113 may be disposed in a hot environment, such that metal bearings may not withstand the temperature. As such, the bearings disposed within the respective hollow core may be heat-tolerant bearings. As used herein, heat-tolerant bearings refers to or includes bearings that are capable of withstanding temperatures up to and including 1200 degrees Celsius. For instance, the shaft 121 may be rotatably mounted to the inner surface 123 of the hollow core 111 of the first idler 101 by a first plurality of ceramic bearings 125-1 and 125-2, and to the inner surface 127 of the hollow core 118 of the second idler 113 by a second plurality of ceramic bearings 129-1 and 129-2. In some examples, the ceramic bearings are dry bearings, such that a lubricant is not applied. Examples are not so limited, however, and in some examples the ceramic bearings include a lubricant.

In some examples, the hollow core 111 of the first idler 101 includes a proximal end 133 that is flush with the proximal end 101-1 of the first idler 101, and a distal end 135 that terminates at a distance from the proximal end 133 corresponding with less than the length of the first idler 101. In various examples, the shaft 121 may be rotatably mounted to the inner surface 123 of the hollow core 111 by a first heat-tolerant bearing 125-2 disposed at the proximal end 133 of the hollow core 111 and a second heat-tolerant bearing 125-1 disposed at the distal end 135 of the hollow core 111. In various examples, the first heat-tolerant bearing 125-2 and the second heat-tolerant bearing 125-1 are ceramic. The hollow core 118 of the second idler 113 may include a proximal end 137 that is flush with the proximal end 113-1 of the second idler 113, and a distal end 139 that terminates at a distance from the proximal end 137 corresponding with less than the length of the second idler 113. In some examples, the shaft 121 is rotatably mounted to the inner surface 127 of the hollow core 118 by a first heat-tolerant bearing 129-2 disposed at the proximal end 137 of the hollow core 118 and a second heat-tolerant bearing 129-1 disposed at the distal end 139 of the hollow core 118.

Figure 2:
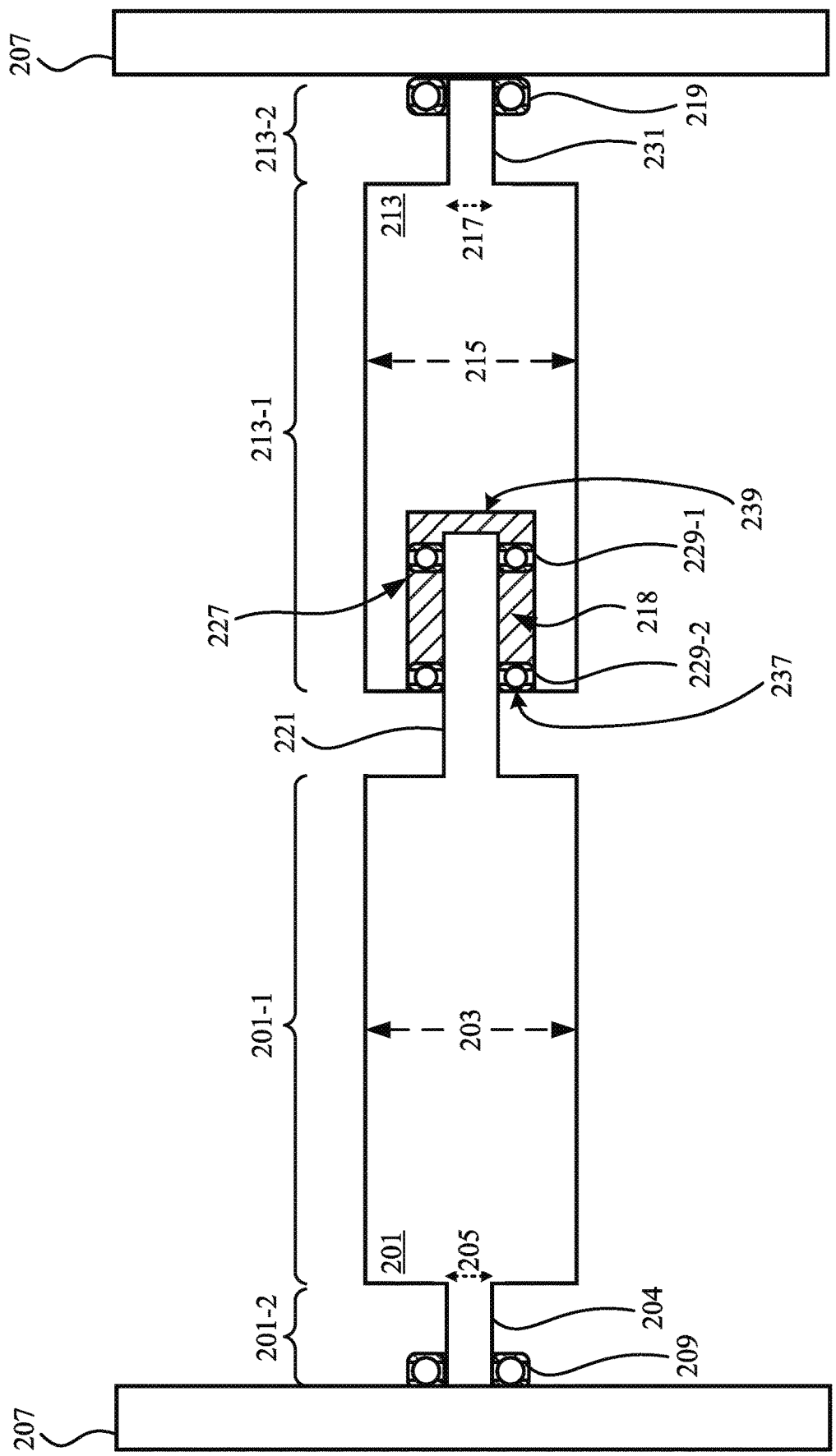
FIG. 2 is a diagram illustrating an example apparatus including a rotatably mounted idler, consistent with the present disclosure.

FIG. 2 is a diagram illustrating an example apparatus including a rotatably mounted idler, consistent with the present disclosure. As discussed with regards to FIG. 1, the apparatus may include a first idler 201 and a second idler 213. The first idler 201 may include a proximal end 201-1 with a shaft 221 extending therefrom, and a distal end 201-2. The proximal end 201-1 may have a thicker diameter 203 relative to a diameter 205 of the distal end 201-2 of the first idler 201. The first idler 201 may be rotatably mounted to a frame 207 of the apparatus by a first speed-tolerant bearing 209 at the distal end 201-2.

As illustrated in FIG. 2, the apparatus may include a second idler 213 having a proximal end 213-1 and a distal end 213-2, where the proximal end 213-1 has a thicker diameter 215 relative to the diameter 217 of the distal end 213-2. The second idler 213 may be rotatably mounted to the frame 207 of the apparatus by a second speed-tolerant bearing 219 at the distal end 213-2. The second idler 213 may have a hollow core 218 at the proximal end 213-1 and extending a portion of a length of the second idler 213. The shaft 221 may be rotatably mounted to an inner surface 227 of the hollow core 218 of the second idler 213 by a plurality of heat-tolerant bearings 229-1 and 229-2. As discussed with regards to FIG. 1, the proximal end 201-1 of the first idler 201 may be separated from the proximal end 213-1 of the second idler 213 such that the first idler 201 and the second idler 213 may rotate independent of one another.

In various examples, the shaft 221 may be rotatably mounted to the inner surface 227 of the hollow core 218 of the second idler 213 by a plurality of heat-tolerant bearings 229-1 and 229-2. Additionally, the shaft 221 may be rotatably mounted to the inner surface 227 of the hollow core 218 of the second idler 213 by a plurality of bushing-style bearings.

The hollow core 218 of the second idler 213 may include a proximal end 237 that is flush with the proximal end 213-1 of the second idler 213, and a distal end 239 that terminates at a distance from the proximal end 237 corresponding with less than the length of the second idler 213. The shaft may be rotatably mounted to the inner surface 227 of the hollow core 218 by a first heat-tolerant bearing 229-2 disposed at the proximal end 237 of the hollow core 218 and a second heat-tolerant bearing 229-1 disposed at the distal end 239 of the hollow core 218. However, examples are not so limited. For instance, the hollow core 218 of the second idler 213 may extend approximately (e.g., around 90%) an entire length of the second idler 213. In such examples, the hollow core 218 includes a distal end 239 that terminates at the distal end 213-2 of the second idler 213, and a proximal end 237 at the proximal end 213-1 of the second idler 213. The shaft 221 may be rotatably mounted to the inner surface 227 of the hollow core 218 by a first heat-tolerant bearing 229-2 disposed at the proximal end 237 of the hollow core 218 and a second heat-tolerant bearing 229-1 disposed at the distal end 239 of the hollow core 218.

Figure 3:
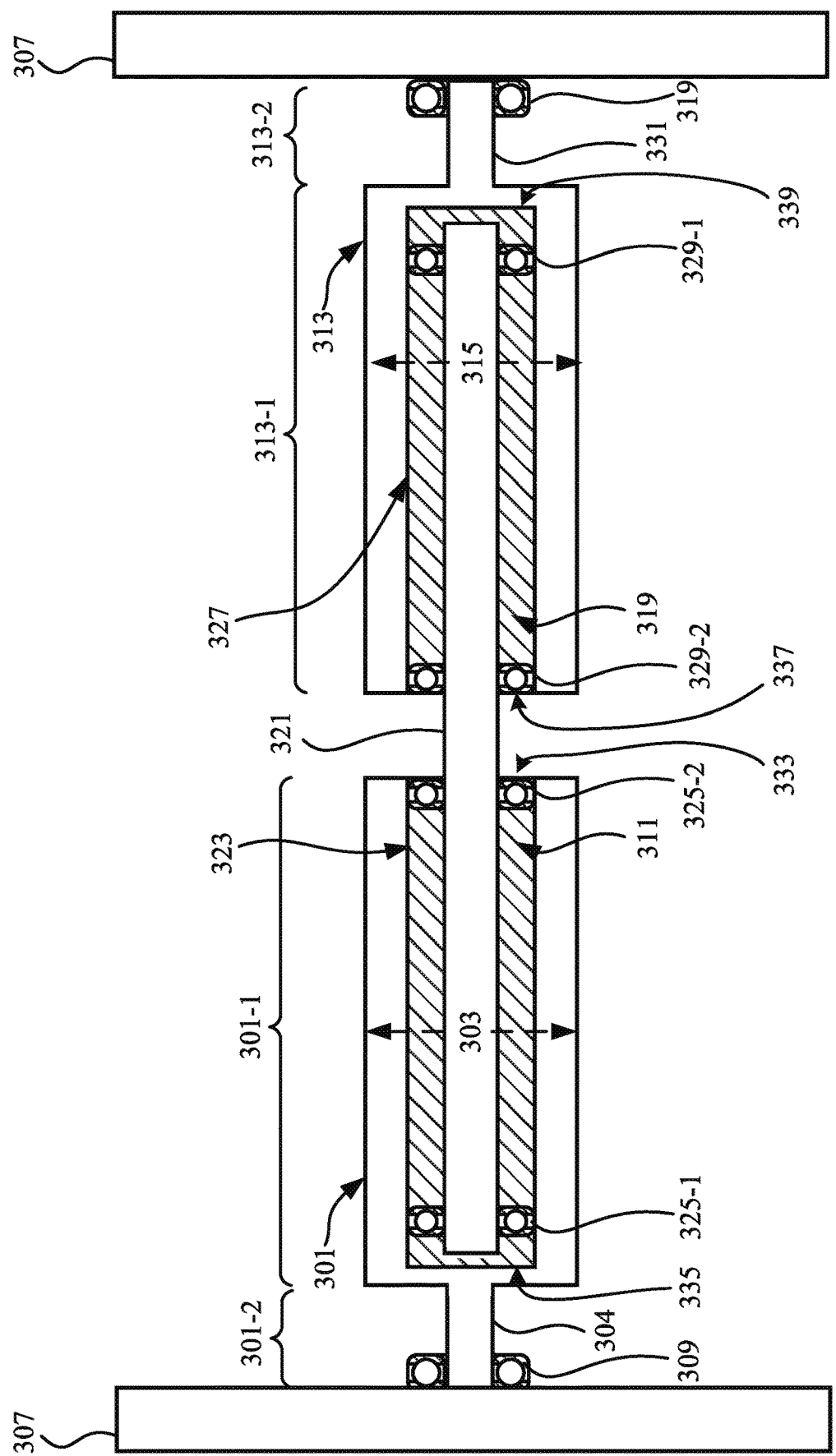
FIG. 3 is a diagram illustrating an example apparatus including a rotatably mounted idler, in accordance with the present disclosure.

FIG. 3 is a diagram illustrating an example apparatus including a rotatably mounted idler, in accordance with the present disclosure. In the example illustrated in FIG. 3, a hollow core extends a length of each respective idler, and the shaft similarly extends the length of the idler. For instance, hollow core 311 extends a length of the proximal end 301-1 of idler 301, terminating before extension 304. Additionally, hollow core 319 extends a length of the proximal end 313-1 of idler 313, terminating before extension 331. Accordingly, the shaft 321 may extend the length of the proximal end 301-1 of idler 301, terminating before extension 304, and extend the length of the proximal end 313-1 of idler 313, terminating before extension 331 (as illustrated).

Heat-tolerant bearings may be disposed at proximal and distal ends of each respective idler to provide support and alignment to the shaft 321. For instance, heat-tolerant bearing 325-2 may be disposed at a proximal end 333 of the hollow core 311, whereas heat-tolerant bearing 325-1 may be disposed at a distal end 335 of the hollow core 311. Similarly, heat-tolerant bearing 329-2 may be disposed at a proximal end 337 of the hollow core 319 and heat-tolerant bearing 329-1 may be disposed at a distal end 339 of the hollow core 319. The extensions of each respective idler may be rotatably coupled to a frame 307 of the printing apparatus via speed-tolerant bearings, as discussed herein. For instance, extension 304 may be rotatably coupled to frame 307 via bearings 309, and extension 331 may be rotatably coupled to frame 307 via bearings 319.

Figure 4:
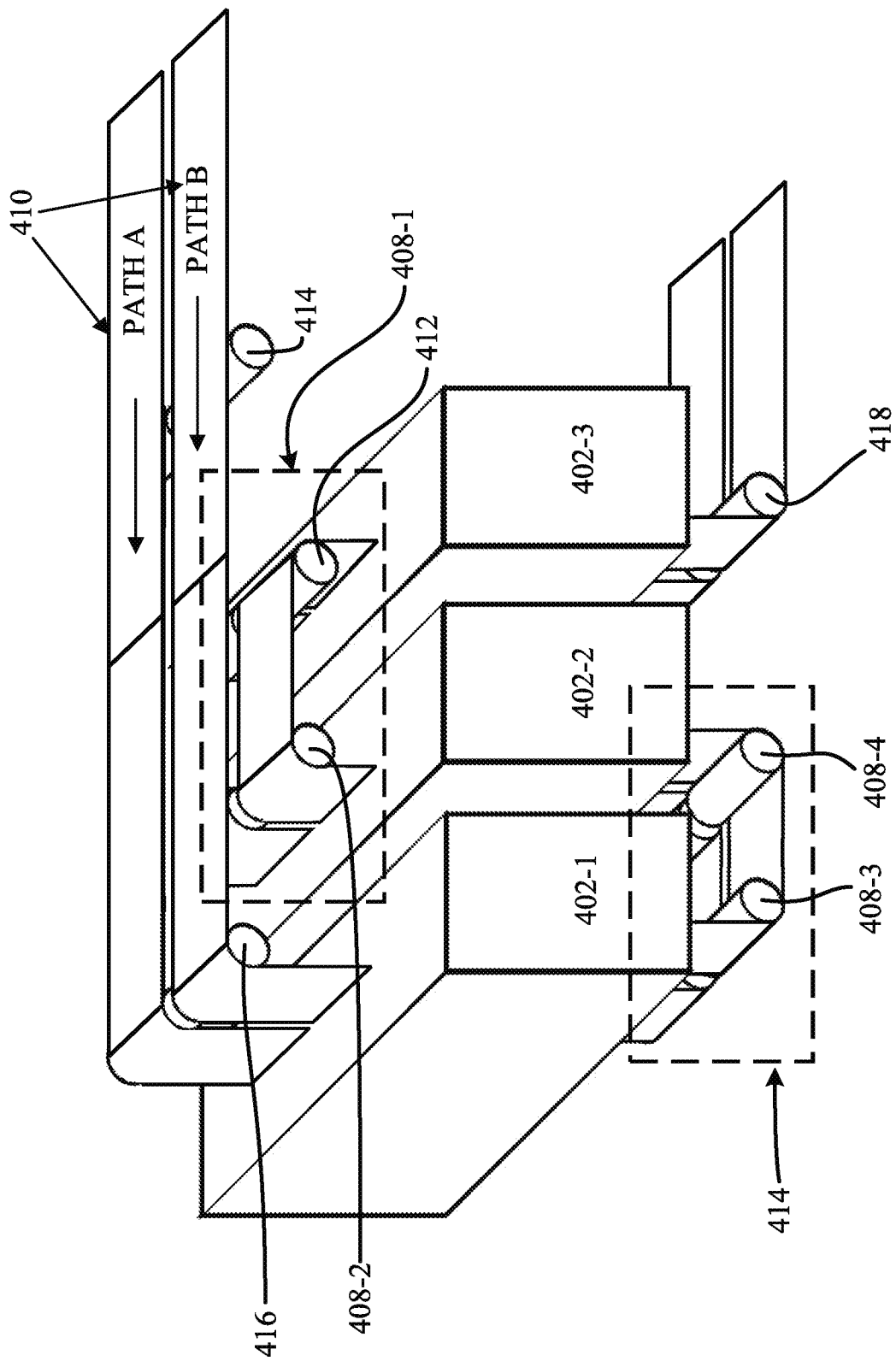
FIG. 4 is a diagram illustrating a system including a rotatably mounted idler, in accordance with the present disclosure.

FIG. 4 is a diagram illustrating a system including a rotatably mounted idler, in accordance with the present disclosure. The system includes a chassis, or frame (not illustrated in FIG. 4), for mounting and/or supporting various components of the printing apparatus described herein. The system further includes a media feed 410, that progresses through the printing apparatus, and along a media path. As illustrated in FIG. 4, the media feed 410 includes two parallel media paths, path A and path B. The printing apparatus includes a plurality of dryers 402-1, 402-2, 402-3 (referred to collectively herein as dryers 402). The dryers 402 may be arranged such that the media path progresses between the dryers in sequential order. For instance, the media may progress from dryer 402-1, to dryer 402-2, to dryer 402-3, weaving through the respective dryers along the path.

As discussed herein, a plurality of co-axial asynchronous idlers 408-1, 408-2, 408-3 and 408-4 may be mounted on the chassis and disposed between the plurality of dryers to allow two or more media paths to progress through the printing apparatus. As used herein, a co-axial asynchronous idler refers to or includes an idler having two or more independent rollers which are capable of rotating at a different rate of speed. The co-axial asynchronous idlers 408-1, 408-2, 408-3, and 408-4 may, as discussed herein, be disposed within hot environments 412 and 414, because the idlers are disposed in close proximity to dryer 402-1, 402-2, and 402-3. As such, the co-axial asynchronous idlers 408-1, 408-2, 408-3, and 408-4 may, in some instances, be referred to as hot split idlers. The co-axial asynchronous idlers 408-1, 408-2, 408-3, and 408-4 may accordingly include heat-tolerant bearings disposed along the shaft separating the two halves of the idler. The system may include additional co-axial asynchronous idlers 414, 416, and 418, arranged outside of the hot environments 412 and 414. As such, co-axial asynchronous idlers 414, 416, and 418 may include metal bearings and/or bushings along the shaft separating the two halves of the idler. Additionally and/or alternatively, all of the co-axial asynchronous idlers (408-1, 408-2, 408-3, 408-4, 414, 416, and 418) may include heat-tolerant bearings along the shaft separating the two halves of the idler.

The idlers implemented in FIG. 4 may include the various aspects illustrated and discussed with regards to FIGS. 1, 2, and 3. For instance, each of the co-axial asynchronous idlers, 408-1, 408-2, 408-3, and 408-4 may include a first idler having a proximal end and a distal end, where the proximal end has a thicker diameter relative to the distal end. The first idler may be rotatably mounted to the chassis by a first speed-tolerant bearing at the distal end. The first idler may further include a hollow core at the proximal end and extending a length of the first idler. Each of the co-axial asynchronous idlers may include a second idler having a proximal end and a distal end, where the proximal end has a thicker diameter relative to the distal end. The second idler may be rotatably mounted to the chassis by a second speed-tolerant bearing at the distal end, and may have a hollow core at the proximal end and extending a length of the second idler.

As discussed herein, a shaft may be rotatably mounted to an inner surface of the hollow core of the first idler by a first plurality of heat-tolerant bearings and to an inner surface of the hollow core of the second idler by a second plurality of heat-tolerant bearings. The proximal end of the first idler may be separated from the proximal end of the second idler by a threshold distance, such that each respective idler is capable of independent rotation. For instance, for each of the plurality of co-axial asynchronous idlers, the first idler is mounted to the chassis independent of the second idler to rotate independent of the second idler. In some examples, the shaft may extend an entirety of the length of the first idler and an entirety of the length of the second idler.

The skilled artisan would recognize that various terminology as used in the Specification (including claims) connote a plain meaning in the art unless otherwise indicated. Based upon the above discussion and illustrations, those skilled in the art will readily recognize that various modifications and changes may be made to the various examples without strictly following the exemplary examples and applications illustrated and described herein.

What is claimed is:

1. An apparatus, comprising:
   a first idler having a proximal end and a distal end, wherein the proximal end has a thicker diameter relative to the distal end, the first idler rotatably mounted to a frame by a first speed-tolerant bearing at the distal end, the first idler having a hollow core at the proximal end and extending a portion of a length of the first idler;
   a second idler having a proximal end and a distal end, wherein the proximal end has a thicker diameter relative to the distal end, the second idler rotatably mounted to the frame by a second speed-tolerant bearing at the distal end, the second idler having a hollow core at the proximal end and extending a portion of a length of the second idler; and
   a shaft rotatably mounted to an inner surface of the hollow core of the first idler by a first plurality of heat-tolerant bearings and to an inner surface of the hollow core of the second idler by a second plurality of heat-tolerant bearings.

2. The apparatus of claim 1, wherein the first speed-tolerant bearing at the distal end of the first idler, and the second speed-tolerant bearing at the distal end of the second idler include metal bearings.

3. The apparatus of claim 1, wherein the shaft is rotatably mounted to the inner surface of the hollow core of the first idler by a first plurality of ceramic bearings, and to the inner surface of the hollow core of the second idler by a second plurality of ceramic bearings.

4. The apparatus of claim 1, wherein the hollow core of the first idler includes a proximal end that is flush with the proximal end of the first idler, and a distal end that terminates at a distance from the proximal end corresponding with less than the length of the first idler, and wherein the shaft is rotatably mounted to the inner surface of the hollow core by a first heat-tolerant bearing disposed at the proximal end of the hollow core and a second heat-tolerant bearing disposed at the distal end of the hollow core.

5. The apparatus of claim 4, wherein the first plurality of heat-tolerant bearings and the second plurality of heat-tolerant bearings are dry ceramic bearings.

6. The apparatus of claim 4, wherein the hollow core of the second idler includes a proximal end that is flush with the proximal end of the second idler, and a distal end that terminates at a distance from the proximal end corresponding with less than the length of the second idler, and wherein the shaft is rotatably mounted to the inner surface of the hollow core by a first heat-tolerant bearing disposed at the proximal end of the hollow core and a second heat-tolerant bearing disposed at the distal end of the hollow core.

7. An apparatus, comprising:
   a first idler having a proximal end with a shaft extending therefrom, and a distal end, wherein the proximal end has a thicker diameter relative to the distal end, wherein the first idler is rotatably mounted to a frame of the apparatus by a first speed-tolerant bearing at the distal end; and
   a second idler having a proximal end and a distal end, wherein the proximal end has a thicker diameter relative to the distal end, and wherein the second idler is rotatably mounted to the frame of the apparatus by a second speed-tolerant bearing at the distal end, the second idler having a hollow core at the proximal end and extending a portion of a length of the second idler;
   wherein the shaft is rotatably mounted to an inner surface of the hollow core of the second idler by a plurality of heat-tolerant bearings.

8. The apparatus of claim 7, wherein the shaft is rotatably mounted to the inner surface of the hollow core of the second idler by a plurality of ceramic bearings, and wherein the first idler is mounted to the frame independent of the second idler to rotate independent of the second idler.

9. The apparatus of claim 7, wherein the shaft is rotatably mounted to the inner surface of the hollow core of the second idler by a plurality of bushing-style bearings.

10. The apparatus of claim 7, wherein the hollow core of the second idler includes a proximal end that is flush with the proximal end of the second idler, and a distal end that terminates at a distance from the proximal end corresponding with less than the length of the second idler, and wherein the shaft is rotatably mounted to the inner surface of the hollow core by a first heat-tolerant bearing disposed at the proximal end of the hollow core and a second heat-tolerant bearing disposed at the distal end of the hollow core.

11. The apparatus of claim 7, wherein the hollow core of the second idler extends an entire length of the second idler, including a distal end that terminates at the distal end of the second idler, and a proximal end at the proximal end of the second idler.

12. The apparatus of claim 11, wherein the shaft is rotatably mounted to the inner surface of the hollow core by a first heat-tolerant bearing disposed at the proximal end of the hollow core and a second heat-tolerant bearing disposed at the distal end of the hollow core.

13. A system, comprising:
   a chassis;
   a media feed including a media path and a plurality of dryers; and
   a plurality of co-axial asynchronous idlers mounted on the chassis and disposed between the plurality of dryers, wherein each of the plurality of co-axial asynchronous idlers, includes:
      a first idler having a proximal end and a distal end, wherein the proximal end has a thicker diameter relative to the distal end, the first idler rotatably mounted to the chassis by a first speed-tolerant bearing at the distal end, the first idler having a hollow core at the proximal end and extending a length of the first idler;
      a second idler having a proximal end and a distal end, wherein the proximal end has a thicker diameter relative to the distal end, the second idler rotatably mounted to the chassis by a second speed-tolerant bearing at the distal end, the second idler having a hollow core at the proximal end and extending a length of the second idler; and a shaft rotatably mounted to an inner surface of the hollow core of the first idler by a first plurality of heat-tolerant bearings and to an inner surface of the hollow core of the second idler by a second plurality of heat-tolerant bearings.

14. The system of claim 13, wherein the shaft extends an entirety of the length of the first idler and an entirety of the length of the second idler.

15. The system of claim 13, wherein for each of the plurality of co-axial asynchronous idlers, the first idler is mounted to the chassis independent of the second idler and the proximal end of the first idler is separated from the proximal end of the second idler by a threshold distance, such that the first idler rotates independent of the second idler.

\* \* \* \* \*